United States Patent [19]

Kravchenko et al.

[11] Patent Number: 4,605,089
[45] Date of Patent: Aug. 12, 1986

[54] METHOD OF AND APPARATUS FOR GENERATING SHEAR SEISMIC WAVES

[75] Inventors: Jury B. Kravchenko, Kiev; Jury A. Baru; Saul G. Osyatinsky, both of Kharkov; Jury V. Timoshin, Kiev; Anatoly I. Makogon, Kharkov; Igor P. Lobas, Kiev; Kim S. Gasilovsky, Lvov; Inna Z. Livshits; Alexei N. Besedin, both of Kharkov, all of U.S.S.R.

[73] Assignee: Spetsialnoe Proektno-Konstruktorskoe I Tekhnologicheskoe Bjuro Po Pogruzhnomu Elektrooborudovaniju Dlya Burenia Skvazhin I Dobychi Nefti VNPO "Potentsial", Kharkov, U.S.S.R.

[21] Appl. No.: 500,920

[22] Filed: Jun. 3, 1983

[51] Int. Cl.$^4$ .............................................. G01V 1/09
[52] U.S. Cl. ..................... 181/114; 172/697; 172/725; 181/121; 181/401; 367/189
[58] Field of Search ............... 181/114, 121, 401, 113; 367/75, 189, 190; 37/DIG. 18; 299/37, 14; 172/697, 725

[56] References Cited

U.S. PATENT DOCUMENTS

| | | |
|---|---|---|
| 3,159,232 | 12/1964 | Fair .................................. 181/114 X |
| 3,336,082 | 8/1967 | Bodine .................................. 299/37 X |
| 3,363,720 | 1/1968 | Mifsud et al. ..................... 181/114 X |
| 4,050,540 | 9/1977 | Cholet et al. ........................ 181/114 |
| 4,064,964 | 12/1977 | Norden ................................. 181/114 |
| 4,078,632 | 3/1978 | Horsman ......................... 181/114 X |
| 4,118,994 | 10/1978 | Layotte et al. ................. 181/121 X |
| 4,135,598 | 1/1979 | Stafford .......................... 181/401 X |
| 4,252,376 | 2/1981 | Gurries ..................... 37/DIG. 18 X |
| 4,271,923 | 6/1981 | Layotte et al. ..................... 181/114 |
| 4,302,825 | 11/1981 | Erich ............................... 367/75 X |

FOREIGN PATENT DOCUMENTS

2276599 1/1976 France .

Primary Examiner—David H. Brown
Assistant Examiner—John E. Griffiths
Attorney, Agent, or Firm—Fleit, Jacobson, Cohn & Price

[57] ABSTRACT

A target member of the seismic energy source is driven into ground surface engagement, as the vehicle, to which the seismic energy source is pivotally connected, moves, due to the target member geometry, that is by resolving the tractive force so that the force driving the target member into the ground is a vector directed at an angle less than 90° to the direction of the vehicle movement. Impulses from an impulse generator are transmitted to the target member after the latter has been driven into the ground, during the vehicle movement or at rest. The impulses are transmitted to propagate in a plane parallel to the ground surface and perpendicularly to the direction of the target member movement. In the apparatus for generating shear seismic waves the target member has a plate-like shape defined by symmetrically convergent flat side surfaces, a flat lower surface, and a concave frontal surface convergent at an acute angle with the flat lower surface to form a cutting edge for cutting into the ground under the action of the tractive force produced by the vehicle.

12 Claims, 17 Drawing Figures

METHOD OF AND APPARATUS FOR GENERATING SHEAR SEISMIC WAVES

BACKGROUND OF THE INVENTION

1. Field of the Invention

The present invention relates to methods and apparatus for generating shear seismic waves in the ground during seismic prospecting.

2. Description of the Prior Art

French Pat. No. 2,276,599 discloses a method of generating shear seismic waves in the ground, which method includes driving a target member into the ground to a predetermined depth and generating a force in the target member by transmitting thereto impulses propagating in a plane generally parallel to the ground surface.

This method is practiced by an apparatus comprising a seismic energy source pivoted to a vehicle and including a target member to be driven into the ground to a predetermined depth and an impulse generator for transmitting the impulses to the target member in a plane generally parallel to the ground surface.

The target member in the prior art apparatus is a plate provided with tenons and adapted to be driven into the ground. The plate being seated down against the ground, a driven mass is being struck against the edge of the plate to thereby generate shear seismic waves in the ground.

Both the prior art method and the apparatus are limited in that they do not provide a satisfactory statistical effect in accumulation or recording of legitimate signals because of superposition of a constant and random noise. It is known that the statistical effect may be improved by increasing the frequency of source-point change but a desired increase in the source-point change is limited by the fact that the target member is first to be driven into the ground and only then the seismic wave generation is possible. Also, the rate of change of position of the prior art apparatus along the spread or the frequency of source-point change are dependent on the auxiliary operations such as conversion of the apparatus from a transport to an operating position and in the reverse order.

Furthermore, a larger amount of disturbing action on the ground at one source point results in comminution of the ground and impairment of its density, which decreases the level of the action and therefore the intensity of the shear wave generation is decreased.

SUMMARY OF THE INVENTION

An object of the invention is the provision of a method of generating shear seismic waves in the ground and of an apparatus for carrying out the method both ensuring a more pronounced statistical effect by increasing the frequency of source-point change.

A further object of the invention is the provision of a more efficient apparatus for generating shear seismic waves in the ground.

Another object of the invention is the provision of an apparatus for generating shear seismic waves in the ground which makes it possible to exclude auxiliary operations related to the driving of the target member of the seismic energy source into the ground.

Also, an object of the invention is the provision of an apparatus for generating shear seismic waves in the ground, wherein the seismic energy source is readily repositioned from a transport to an operating positions and in the reverse order.

Still another object of the invention is the provision of an apparatus for generating shear seismic waves in the ground ensuring a more reliable holding of the seismic energy source in a transport position and a quick release of the same source for its repositioning to an operating position.

These and other objects of the invention are attained by the provision of a method of generating shear seismic waves in the ground by a mobile seismic energy source having a target member to be driven into ground surface engagement, which includes driving the target member into the ground to a predetermined depth and generating a force in the target member by transmitting thereto impulses propagating in a plane generally parallel to the ground surface, wherein according to the invention the target member is moved along the ground surface profile under the action of the tractive force of a vehicle and, as it is pulled along, the driving of the target member into the ground is carried out and the impulses are transmitted to propagate perpendicularly to the direction of the target member movement.

In practicing the method the impulses may be transmitted to the target member when the vehicle is at rest following the driving of the target member to a predetermined depth and having a sufficient number of impulses transmitted, the target member, still in the ground, may be pulled to another source point. Thus the source-point change is quicker to thereby ensure a higher rate of accumulation of the signals as they are recorded and hence statistical effect is improved.

The method may be carried into effect continuously, that is without stoppages, in other words, the target member may be moved on in the same direction after it has been driven into the ground to a predetermined depth and the step of generating a force in the target member may simultaneously be performed.

The above and other objects of the invention are also attained by an apparatus for carrying out the method, which apparatus comprises a seismic energy source pivoted to a vehicle and including a target member to be driven into the ground to a predetermined depth and an impulse generator for transmitting the impulses to the target member in a plane generally parallel to the ground surface, wherein according to the invention the target member has a plate-like form defined by flat side surface convergent symmetrically to form an acute angle, a flat lower surface for limiting the depth of the target member driving into the ground by a predetermined depth, and a concave frontal surface convergent at an acute angle with the flat lower surface in the direction of convergence of the flat side surface to thereby provide a cutting edge for cutting into the ground under the action of the tractive force produced by the vehicle and the impulse generator is so connected to the target member that the impulses are transmitted to the side surfaces thereof in a direction substantially perpendicular to these surfaces, while the pivotal connection of the seismic energy source to the vehicle is effected by drawbars, which form a three point linkage lying in a plane parallel to the vertical plane of symmetry of the vehicle.

Due to the application of the tractive force of a vehicle to the seismic energy source in an operating position such arrangement makes it possible to drive the target member into the ground by resolving the tractive force, the force driving the target member into the ground being a vector directed at an angle less than 90° to the direction of the vehicle movement.

In order to exclude comminution of the ground, as the target member is driven in, the frontal surface of the target member may be provided with a cutter having a cutting edge directed coincidentally with the direction of the vehicle movement, the side surfaces of the cutter in this embodiment may smoothly intersect with the frontal surface of the target member. The cutting of the cutter may preferably have a saw-tooth profile.

The apparatus of the invention is preferably provided with a seismic energy source, which is capable of setting an optimum angle of entry into the ground for the target member. To provide a quick setting of the angle of entry the pivotal connection of the seismic energy source with the vehicle may comprise two drawbars of which one has a constant length and the other has a variable length. The constant-length drawbar may be connected to the vehicle by means of a pivot joint having at least two degrees of freedom, which improves maneuverability of the seismic energy source. Also such connection of the seismic energy source with the vehicle makes it possible to quickly reposition the seismic energy source from an operating position to a transport position and in the reverse order, which is a favorable factor in increasing the frequency of the source-point change and consequently the efficiency of seismic prospecting as well as in making the statistical effect of accumulation more pronounced.

According to a further aspect of the invention the target member may be provided with a guide roller rotatably supported on the side surface thereof and with a support member having an oval end face and off centered on a spline pin extending from the side surface of the target member, while the vehicle, in this case, carries a holder for the seismic energy source in a transport position, which holder having an entry guide portion and a lock means for co-operation with the oval-faced support member. Such a modified version of the apparatus of the invention ensures a reliable holding of the seismic energy source in a transport position as well as a quick release of the same source for its repositioning into an operating position and, on the whole, all this is contributing to making the statistical effect more pronounced.

BRIEF DESCRIPTION OF THE DRAWINGS

Now the invention is described by way of example with references to the appended drawings, in which.

DETAILED DESCRIPTION OF A PREFERRED EMBODIMENT OF THE INVENTION

Figure 1:
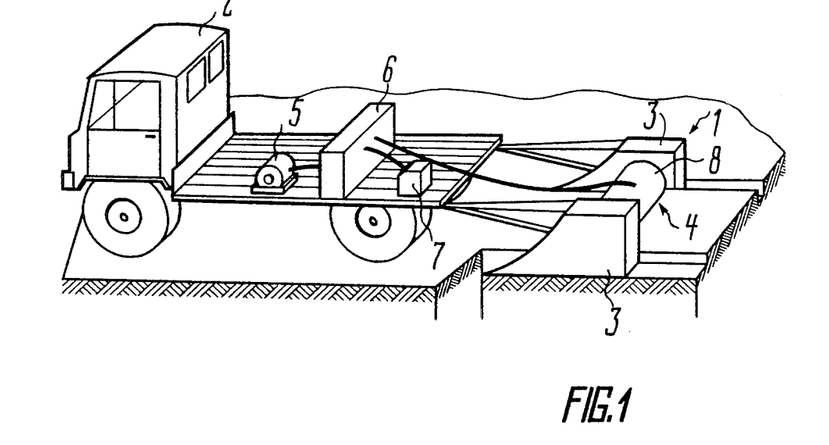
FIG. 1 is a diagrammatical representation of an apparatus for carrying out a method of the invention.

Practicing the method according to the invention may be illustrated by an apparatus generally shown in FIG. 1 and comprising a seismic energy source 1 pivotally connected to a vehicle 2 and including a target member 3 to be driven into the ground to a predetermined depth (the present embodiment comprises two target members 3 to provide greater stability) and an impulse generator 4 for transmitting these impulses to the target member 3 in a plane generally parallel to the ground surface since insignificant deviations in parallelism due to local conditions are possible.

As the vehicle 2 moves along the ground profile, the target member 3 is driven into the ground. The target member 3 having been driven into the ground, a power supply unit 5 generates electrical power, which is accumulated in a power storage unit 6. In response to a signal from a control unit 7 accumulated power is discharged as short-time current pulses to the windings of an electrodynamic transducer 8.

Figure 2:
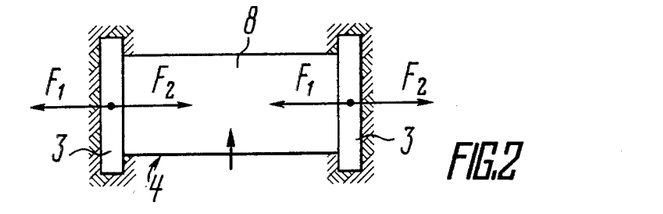
FIG. 2 is a diagram showing application of forces on the seismic energy source.

Interaction of currents, which takes place in the electrodynamic transducer 8 as a force F, is transmitted to the target member 3 to generate shear seismic waves in the ground (FIG. 2).

In order to exclude compressional components of the seismic waves the target members 3 are subjected to an alternate action by equal and counteracting forces $F_1$ and $F_2$. As can be seen in FIG. 2 the impulses are propagated at right angles to the direction of travel or movement of the vehicle 2 and, consequently, of the target member 3.

The method of the invention may be carried out by utilizing other types of impulse generators, for example, those using gases or explosives to generate a force.

Figure 3:
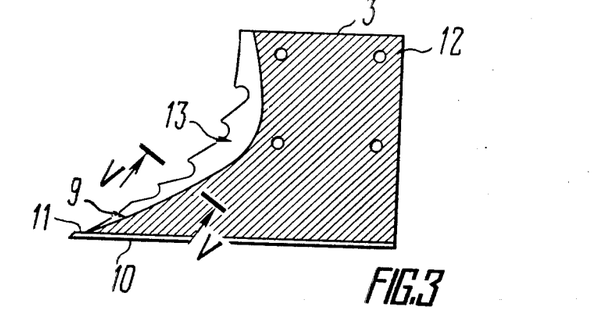
FIG. 3 is a side view partially in cross section, of a target member of the seismic energy source.
Figure 4:
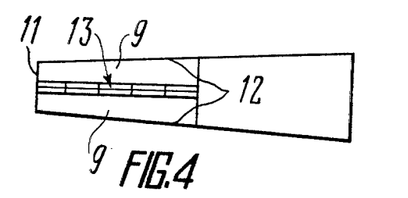
FIG. 4 is a plan view of the target member of the seismic energy source.
Figure 5:
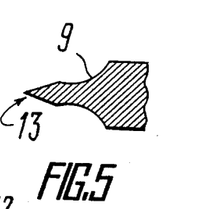
FIG. 5 is a sectional view along the line V—V in FIG. 3 showing an embodiment incorporating a cutter.

Referring to FIG. 3, shown there is a target member 3, which is an operating part of the seismic energy source 1. The target member 3 is a plate-like structure defined by a concave frontal surface 9 and a flat lower surface 10. The surface 10 is provided to limit the depth of driving the target member 3 into the ground by a predetermined depth. The surfaces 9 and 10 form a wedge having a cutting edge 11. The target member 3 is also defined by flat side surfaces 12 divergent symmetrically from the cutting edge to form an acute angle (FIG. 4). The side surfaces 12, extending at an acute angle therebetween, improve density of the ground, as the target member 3 passes into the ground, and thereby improve an acoustic effect. With a view of excluding comminution of the ground the frontal surface 9 is provided with a cutter 13 having a cutting edge directed coincidentally with the direction of the movement of the veicle 2 and the side surfaces of the cutter 13 intersect with the frontal surface 9 (FIG. 5). Also, the cutting edge of the cutter 12 has a saw-tooth profile (FIG. 3), which improves the ground cutting conditions.

Figure 6:
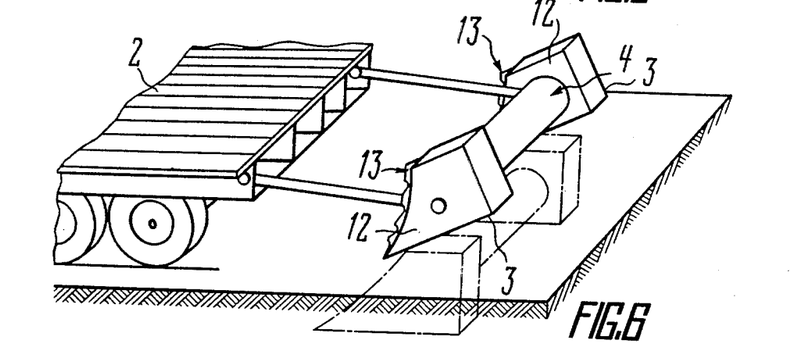
FIG. 6 is a fragmentary view of the apparatus of the invention with the target member in the process of passing into the ground.

As can be seen in FIG. 6 the seismic energy source 1 comprises two target members 3 rigidly interconnected by any conventional method. Between the target members 3 there is arranged the impulse generator 4 operatively connected to the target members 3 for transmitting to their side surfaces 12 the impulses propagating in a plane parallel to the ground surface and substantially perpendicularly to the same side surfaces, deviations from perpendicularity being due to an angular position of the side surfaces 12.

Figure 7:
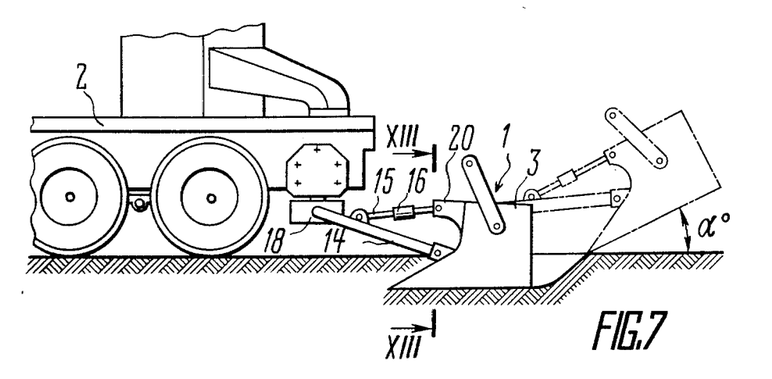
FIG. 7 is a view of the apparatus of the invention with the seismic energy source in an operating position, specifically illustrating a pivotal connection of the seismic energy source with the vehicle.
Figure 8:
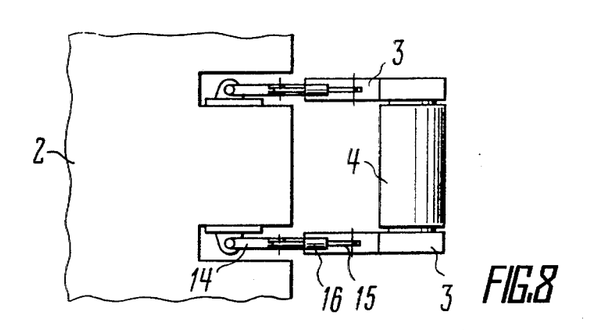
FIG. 8 is a plan view of the apparatus according to the invention.
Figure 9:
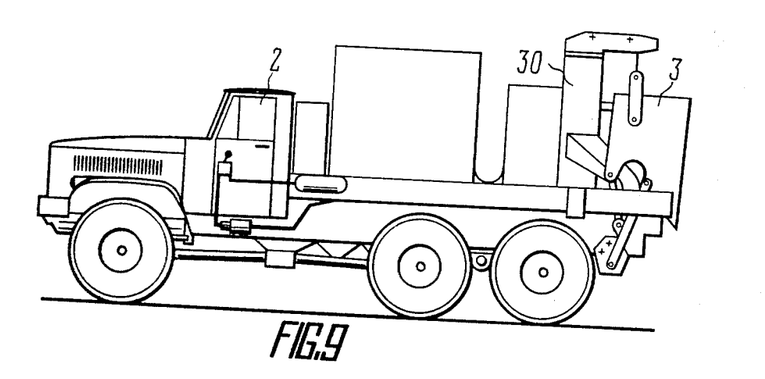
FIG. 9 is a view of the apparatus of the invention in a transport position.
Figure 10:
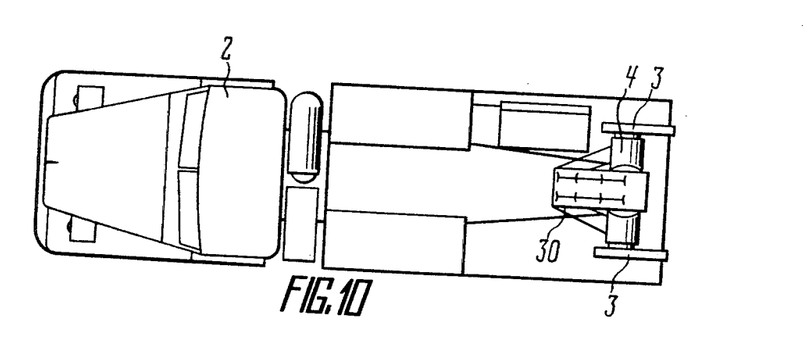
FIG. 10 is a view similar to that shown in FIG. 9 but seen from above.

For a more specific illustration of the apparatus of the invention references are made to FIGS. 7 through 10 wherein shown is an assembly forming part of a seismic exploration station. In FIG. 7, the seismic energy source 1 is pivotally connected to the vehicle 2 by a drawbar assembly including a drawbar 14 of a constant-length and a drawbar 15 of a variable length. The drawbars 14 and 15 form together with the seismic energy source 1 and more specifically with the target member 3 a three point linkage lying in a plane parallel to the vertical plane of symmetry of the vehicle. The drawbar 15 consists of two parts interconnected by a turnbuckle 16, whereby control of the angle of entry of the target members 3 into the ground is provided.

Figure 11:
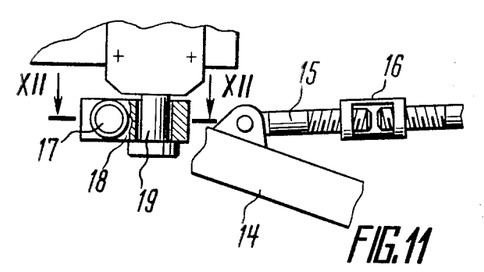
FIG. 11 is a view of a joint coupling the seismic energy source with the vehicle.
Figure 12:
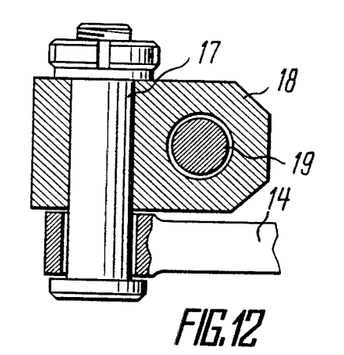
FIG. 12 is a sectional view along the line XII—XII in FIG. 11.
Figure 13:
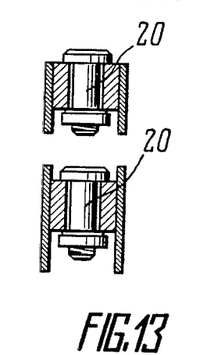
FIG. 13 is a sectional view along the line XIII—XIII in FIG. 7.
Figure 14:
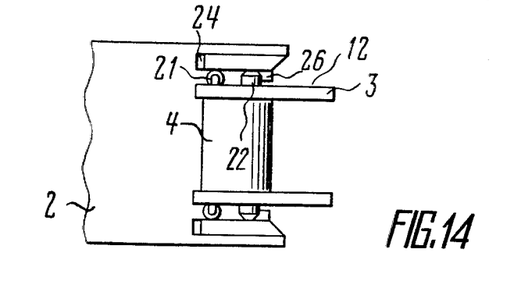
FIG. 14 is an embodiment of the invention illustrating the seismic energy source in a transport position as seen from above.

The drawbar 14 is rotatable on a pivot pin 17 (FIGS. 11 and 12) in a plane parallel to the vertical plane of symmetry of the vehicle while together with a cage 18 it is rotatable on a pin 19 in a plane perpendicular to the same vertical plane of symmetry of the vehicle. The target members 3 are pivotally connected to the drawbars 14 and 15 by pins 20 (FIG. 13).

Shown in FIGS. 14 through 17 is one of the possible embodiments of the invention according to which each target member 3, presently on the outer side surfaces 12, has guide rollers 21 and round support members 22 each having an oval end face and off centered on a spline pin 23. The vehicle 2 carries a holder 24 for the seismic energy source 1 in a transport position. The holder 24 has an entry guide portion 25 and locks 26 for co-operation with the support members 24. For more detail the present arrangement is described with reference to FIG. 17, in which lock 26 comprises a pawl 27, an actuator 28 for rotating the pawl 27, and a stop 29 for holding the pawl 27 in a locked position.

Figure 15:
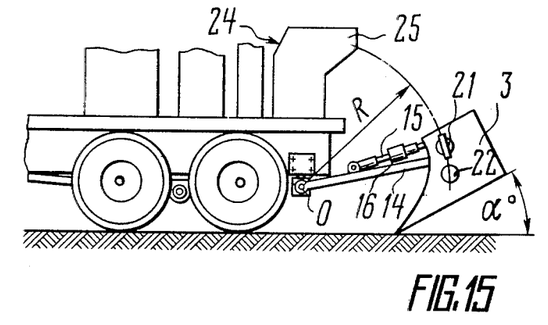
FIG. 15 is a view of the seismic energy source according to the embodiment of FIG. 14, shown in a position prior to being driven into the ground.
Figure 16:
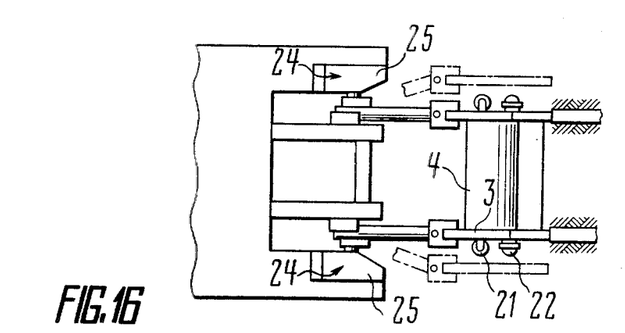
FIG. 16 is a view similar to that shown in FIG. 15 but seen from above.

The apparatus of the invention operates as follows. At the location of a geophysical survey the seismic energy source 1 is repositioned from a transport position (FIGS. 17 and 14) to an operating position (FIG. 15). To this effect a lifting mechanism 30 is utilised to lift the seismic energy source 1 and to release the pawl 27 from the support member 24. The actuator 28 rotates the pawl to a position in which the source 1 may be readily lowered to the ground so as to set the entry angle α, which is indispensable for the passing of the target member 3 into the ground. This angle α has a correspondence with the only radius R with which the seismic energy source 1 rotates about an axis 0 and with a position of the support member 22 on the pin 23. Variations in the angle α due to the ground density bring about variations in the radius R, wherein the radius R is the distance from the point 0 to the center of the circumference defining the periphery of the support member 22.

Figure 17:
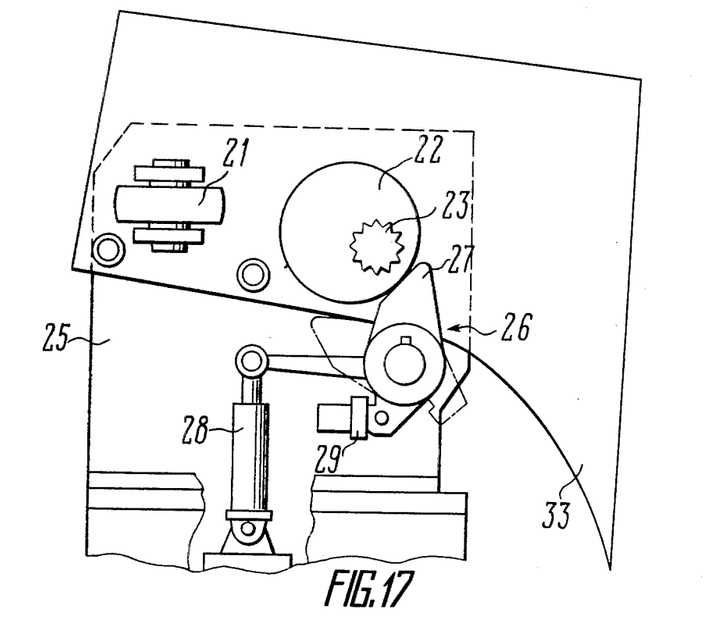
FIG. 17 is an enlarged view of the seismic energy source in a transport position, illustrating features providing for holding the seismic energy source in a transport position.

In order that the seismic energy source 1 be held in a transport position the support members 22 should be in contact with the pawls 27. The support members 22 and the pawls 27 are held in contact due to the fact that the support member 22 is off centered on the spline pin 23. The position of the support members 22 with respect to the angle α is controlled by repositioning the support members 22 on their respective pins 23.

As soon as the target members 3 come in contact with the ground, the vehicle starts moving (repositioning of the seismic energy source from a transport position to an operating position may also be effected while the vehicle moves with a suitable speed) and the target members 3 begin to pass into the ground. It is to be readily understood by those skilled in the art that the target members are driven into the ground by resolving the tractive force as a result of resistance by the ground to the movement of the surface 9, the force driving the target member into the ground being a vector in the form of a net force directed at an angle less than 90° to the direction of the vehicle movement. The target members 3 pass into the ground until the bottom of the furrow produced is parallel to the ground surface.

Now the vehicle may be stopped to have a record of the reflected seismic waves produced at a source point or the movement may continue while the impulses from the generator 4 are transmitted to the target members 3.

Having the operation at one source point completed, the seismic energy source 1 is set to a transport position in readiness for transfer to another source point.

In order to set the seismic energy source 1 to a transport position the source 1 is lifted by the lifting mechanism 30. As the seismic energy source is lifted the rollers 21 roll on the walls of the entry guide portion 25 to guide the source 1 if it is offset from the axis of symmetry of the vehicle (see FIG. 16). The oval end faces of the support member 22 serve the same purpose as above. After the source 1 is raised to an appropriate height, the actuator 28 is set in motion and rotates the pawl 27 until the latter comes in contact with the stop 29. Now the lifting mechanism 30 lowers the source 1 until the support members 22 are seated on the pawls 27.

What is claimed is:

1. A method of generating shear seismic waves in the ground by a mobile seismic energy source, comprising a target member penetrating the ground, including the steps of:
   utilizing as the target member a structure defined by a concave frontal surface and a flat lower surface both forming parts of a wedge with a cutting edge and symmetrically divergent from the cutting edge in the form of essentially flat side surfaces inclined to each other at an acute angle;
   bringing said target member in contact with the ground;
   moving said target member along the ground profile by a tractive force of a land vehicle;
   forcing said target member into the ground to a preset depth by using a component of said tractive force of the land vehicle and dependent on the specified shape of said target member, simultaneously with said movement of said target member along the ground profile during which the net force acting on said target member is directed at an angle less than 90° to the direction of movement of the land vehicle; and generating a force in said target member by transmitting thereto mechanical impulses in a plane generally parallel to the ground surface and essentially perpendicular to the direction of movement of said target member.

2. A method according to claim 1, wherein, having reached the preset depth, said target member is moved further in its direction of movement along the ground profile and, simultaneously, the step of generating a force in said target member is performed.

3. A method according to claim 1, wherein said bringing step includes pivoting said target member on the land vehicle into contact with the ground with said flat lower surface of said target member extending at an angle less than 90° to the direction of movement of the land vehicle, such that said net force acting on said target member during the forcing step forces said target member into the ground until said flat lower surface extends parallel to the ground surface.

4. A method according to claim 3, which further comprises:

providing two of said target members in spaced relationship during the utilizing step; and simultaneously generating forces in said target members after the forcing step by transmitting mechanical impulses to opposed ones of said target member side surfaces from a point between said target members and above the ground surface in outward directions parallel to the ground surface and essentially perpendicular to the direction of movement of said target members, after said target members have penetrated the ground to said preset depth.

5. In a mobile apparatus for generating shear seismic waves in the ground, a combination of a seismic energy source pivoted to a land vehicle so as to be capable of assuming an operating position and a raised position, and comprising:

a target member to be forced into the ground and shaped as a structure defined by a concave frontal surface and a flat lower surface to limit the penetration of said target member into the ground to a preset depth, said concave frontal surface and said flat lower surface forming parts of a wedge with a cutting edge and symmetrically divergent from said cutting edge in the form of essentially flat side surfaces included at an acute angle to each other, and a generator of mechanical impulses operatively connected with said target member for transmitting to said side surfaces thereof impulses propagating in a plane parallel to the ground surface and substantially perpendicular to said side surfaces, and a drawbar assembly pivotally connecting said seismic energy source with the land vehicle such that the drawbar assembly and said energy source combine to form a three-point linkage lying in a plane parallel to a vertical plane of symmetry of the land vehicle, with the wedge of said target member directed towards the vehicle, such that the net force applied to said target member when the land vehicle is moving with said energy source in the operating position forces said target member into the ground as a result of a component of a tractive force of the land vehicle, said net force forcing said target member into the ground being always directed at an angle less than 90° to the direction of movement of the land vehicle.

6. A combination according to claim 5, wherein said target member is provided with a guide roller disposed on one of said side surfaces symmetrically divergent from said cutting edge of said target member and at an acute angle to each other, a spline pin extending from said side surface and a support member having a spherical end face and off-centered on said spline pin, and the land vehicle has a holder for said seismic energy source to be kept in the raised position, said holder having an entry guide portion and a lock means for cooperation with the spherical-faced support member.

7. A combination according to claim 5, wherein the drawbar assembly comprises two drawbars of which one has a constant length and the other has a variable length.

8. A combination according to claim 7, wherein the constant-length drawbar is coupled with the land vehicle by a pivot joint having at least two degrees of freedom.

9. A combination according to claim 5, wherein said frontal surface of said target member is provided with a knife, a cutting edge of which is directed towards the direction of movement of the land vehicle, with side surfaces of said knife changing into said frontal surface of said target member.

10. A combination according to claim 9, wherein, to improve ground cutting conditions and making ground loosening unnecessary, said knife has a saw-tooth profile.

11. A combination according to claim 5, wherein said drawbar assembly pivotally mounts said target member on said land vehicle such that said target member is engageable with the ground with said flat lower surface of said target member extending at an angle less than 90° to the direction of movement of said land vehicle, and such that said net place forces said target member into the ground until said flat lower surface extends parallel to the ground surface.

12. A combination according to claim 11, wherein two of said target members are pivotally mounted on said land vehicle by said drawbar assembly in spaced relationship, and said generator of mechanical impulses is mounted between said spaced target members for transmitting impulses to opposed ones of said target member side surfaces above the ground after said target members have penetrated the ground to said preset depth, and in outward directions parallel to the ground surface and essentially perpendicular to the direction of movement of said target members.

* * * * *